J. S. MILLER.
Car Spring.
No. 67,897.
Patented Aug. 20, 1867.
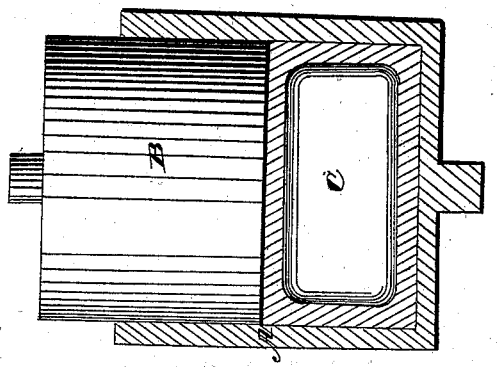
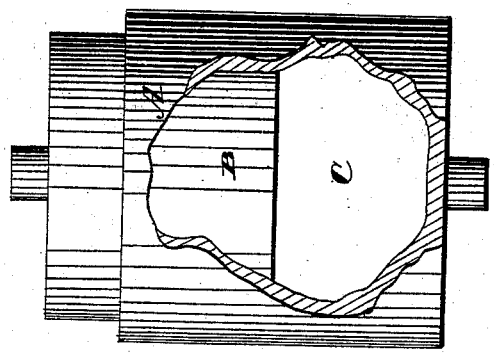

United States Patent Office.

JOHN S. MILLER, OF SPRINGFIELD, MASSACHUSETTS, ASSIGNOR TO HIMSELF AND L. L. DAVIS, OF SAME PLACE.

Letters Patent No. 67,897, dated August 20, 1867; antedated August 5, 1867.

IMPROVED CAR-SPRING.

*The Schedule referred to in these Letters Patent and making part of the same.*

TO ALL WHOM IT MAY CONCERN:

Be it known that I, JOHN S. MILLER, of Springfield, Hampden county, Commonwealth of Massachusetts, have invented a new and useful Car-Spring; and I do hereby declare that the following is a full and exact description thereof, reference being had to the accompanying drawings, and to the letters of reference marked thereon. In the drawings—

Figure 1 represents a section view of my invention, and

Figure 2 a side view of the same with a part broken out.

My invention consists of a car-spring whose principle is the compression of the air for a cushion. This is arranged in a peculiar manner, which I will now describe.

I form my spring of a cylindrical case, A, made of suitable material, and having a plunger, B, working in it; the case A being attached to the running-gear, and the plunger to the body of the car. The plunger B is made to fit closely in the case, but is not cushioned merely by confined air between it and the bottom of the cylinder, but that part of the cylinder is filled with a rubber case, C, which is made to fit the bore of the cylinder, and is hollow and perfectly air-tight, so that when it is compressed by the plunger the air inside of the rubber case is compressed with it. Thus I obtain the full elasticity of the air confined, and that of the rubber beside, for my spring. By this arrangement I have a perfect spring, and one that never loses its elasticity, there being no possible outlet for the air in the case of rubber, consequently the spring is always of the same strength. If by any possible means the rubber cushions should be damaged, it only requires that a new one of rubber be dropped in the place of the old one, the plunger being easily taken out. The rubber cushion is, however, very durable, for, having the same pressure always on the outside and inside, except a slight difference in the movement of compression or reaction, there is nothing which could cause either wear or fracture, and in order to give greater security against this it is formed much thicker at the corners, where it would be most liable to crack.

Now, having described my invention, what I claim as new, and desire to secure by Letters Patent, is—

The combination and arrangement of the spring for cars, &c., formed of a cushion of air enclosed in a case, C, of rubber, or similar elastic material, placed within a cylinder, A, operated upon by a piston, B, the whole constructed and operating substantially as described.

JOHN S. MILLER.

Witnesses:
J. B. GARDINER,
EDW. H. HYDE.